Figure 1:
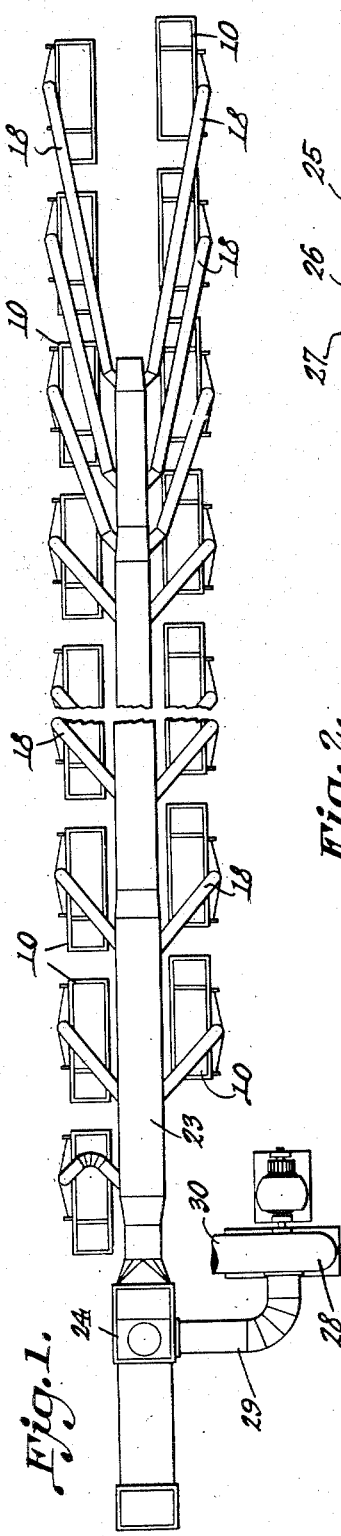

April 30, 1929.  H. M. HERBENER  1,710,977
METHOD OF AND APPARATUS FOR PRODUCING FELT
AND PRODUCT OBTAINED THEREFROM
Original Filed Feb. 15, 1924   3 Sheets-Sheet 1

Inventor
Henry M. Herbener
By
Attorney

April 30, 1929.   H. M. HERBENER   1,710,977
METHOD OF AND APPARATUS FOR PRODUCING FELT
AND PRODUCT OBTAINED THEREFROM
Original Filed Feb. 15, 1924   3 Sheets-Sheet 2
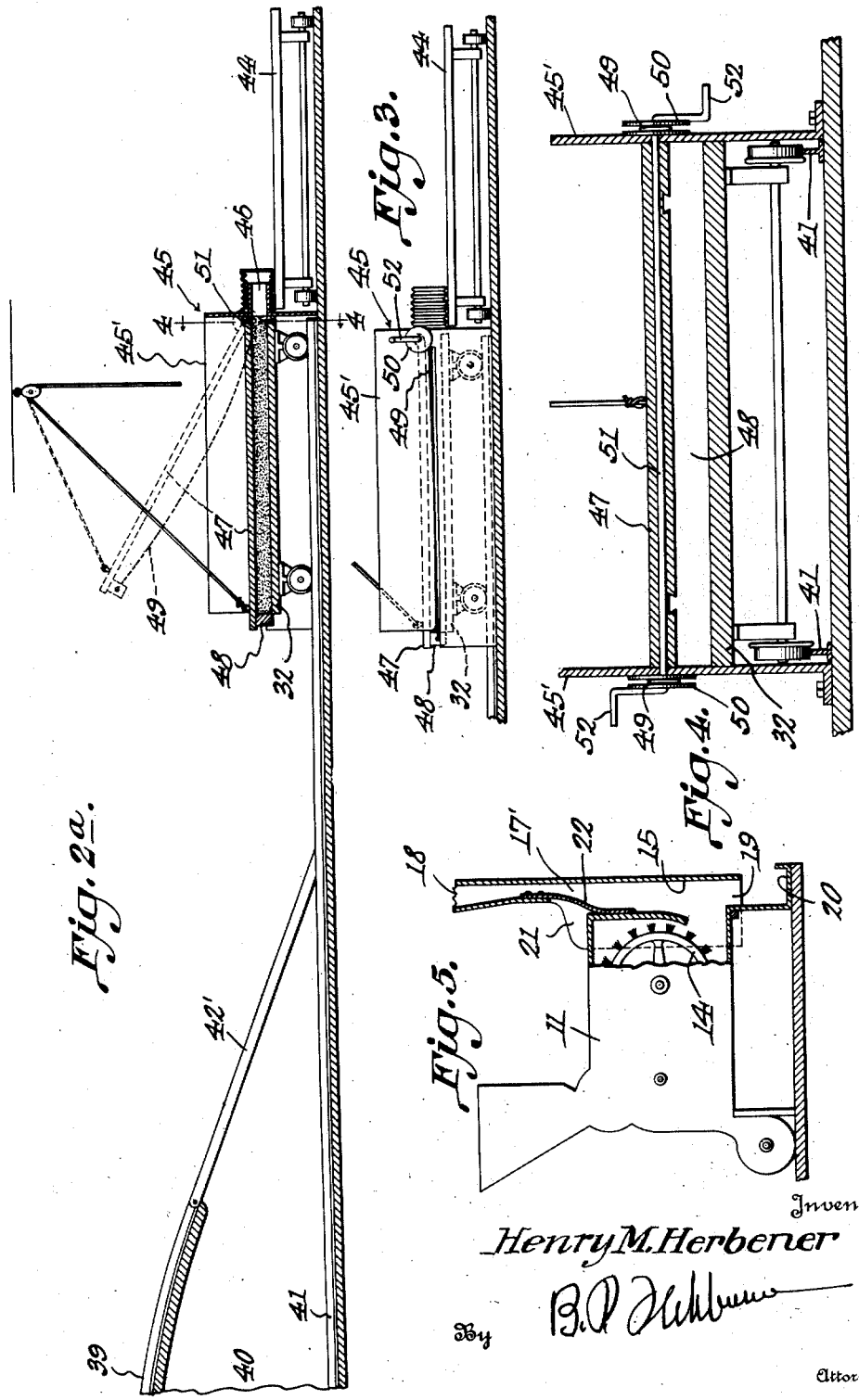
Inventor
Henry M. Herbener
By B. P. Herbener
Attorney

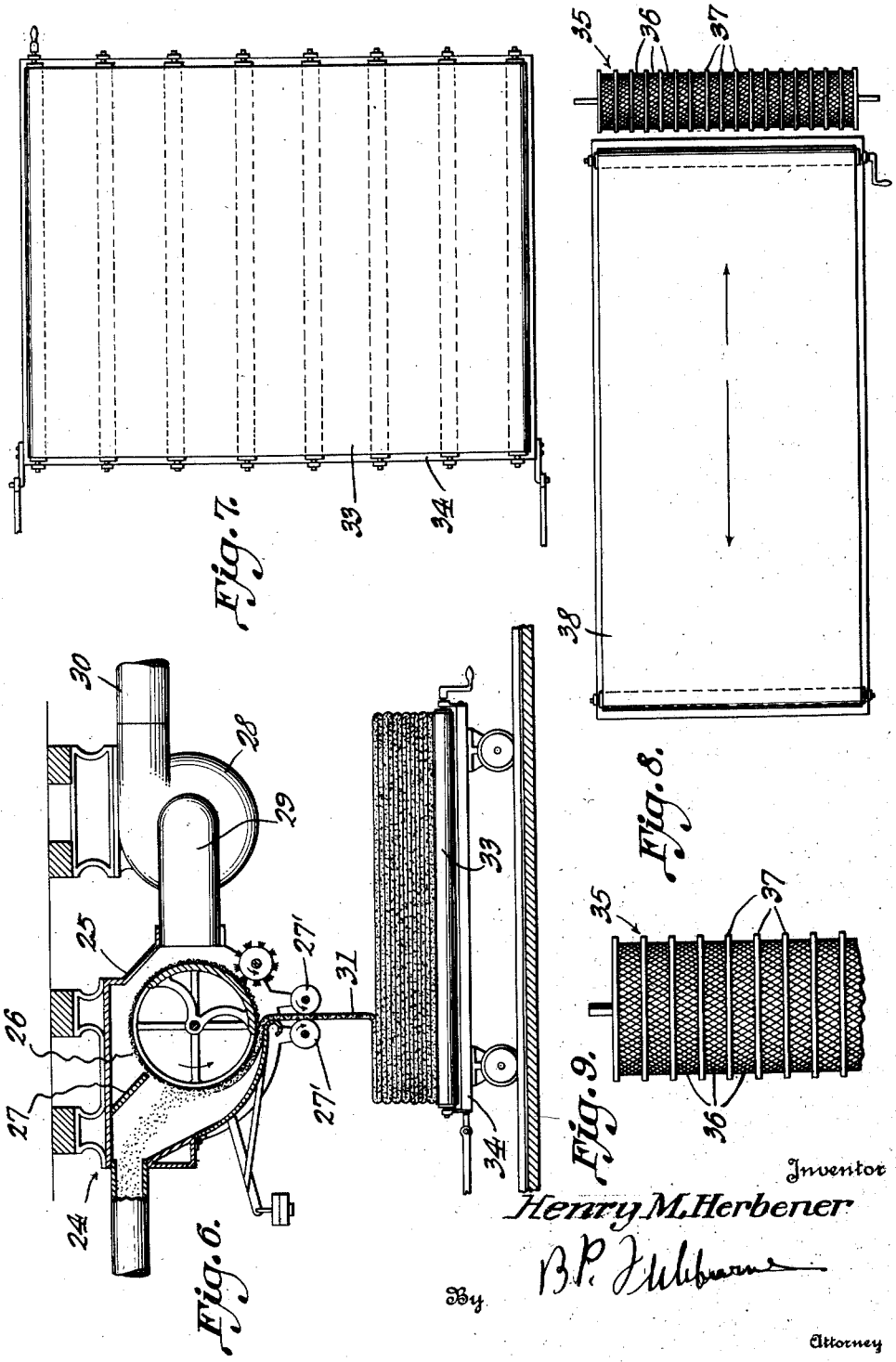

Patented Apr. 30, 1929.

1,710,977

UNITED STATES PATENT OFFICE.

HENRY M. HERBENER, OF MEMPHIS, TENNESSEE, ASSIGNOR, BY MESNE ASSIGN-MENTS, TO CONSOLIDATED MATTRESS CO., OF BOSTON, MASSACHUSETTS, A CORPORATION OF MASSACHUSETTS.

METHOD OF AND APPARATUS FOR PRODUCING FELT AND PRODUCT OBTAINED THEREFROM.

Application filed February 15, 1924, Serial No. 693,136. Renewed August 1, 1928.

My invention relates to a method of and apparatus for producing felt from the fibre or cotton on cotton seed, and to the product thus obtained.

In accordance with the well known practice of producing felt for stuffing mattresses, upholstery or the like, the cotton seed is fed into one or more linter gins, each of which is equipped with a condenser embodying a rotatable screen drum. The linters are removed from the screen drum and without any attempt to preserve the same in the form of layers, it is fed into a press. It is also the practice to have a common condenser embodying a screen drum, receiving the linters from the several linter gins, and the linters from the condenser are fed into a press and pressed into a bale, without any attempt to preserve the layer form. Now when it is desired to make a mattress, a bale or bales of linters is run through a garnetting machine, which thoroughly combs the fibre of the linters, arranging the same in approximately parallel relation and forms the same into felt. These machines are large and expensive to manufacture and operate, and it has heretofore been necessary to run the linters through the garnetting machine, not only for producing the felt, but for removing foreign matter therefrom, such as cotton seed.

By the employment of my method and apparatus, I am enabled to eliminate the individual condensers at each lint machine, which is frequently employed in the trade at the present time, and also remove from the presence of the linters, at the linter gins, foreign matter, such as cotton seed or the like, by the action of gravity upon such foreign matter, while suspended in the air with the linters, and eliminate the running of the linters through a regular garnetting machine, after being condensed, thereby reducing the cost of production materially, saving a large loss in weight of the linters, which invariably results from the operation of the garnetting machine. By the practice of my method I produce linters in the form of felt, preferably of the desired width and length for the use for which it is intended, and may arrange the same in any suitable number of layers or thickness for the desired purpose, and retain the same in the felt form. These felt linters thus produced are ready for use in stuffing mattresses or the like without the necessity of passing the same through a garnetting machine. I have discovered that the character of the felt thus produced is superior to that obtained by the use of the garnetting machine. The felt produced by the garnetting machine has its fibres extending generally parallel with the longitudinal axis of the felt, which weakens the transverse tensile strength of the felt. The felt produced by my method, has its fibres extending substantially uniform in all directions, in the plane of the felt, and the tensile strength of the felt is substantially uniform in all directions in its plane.

Figure 2:
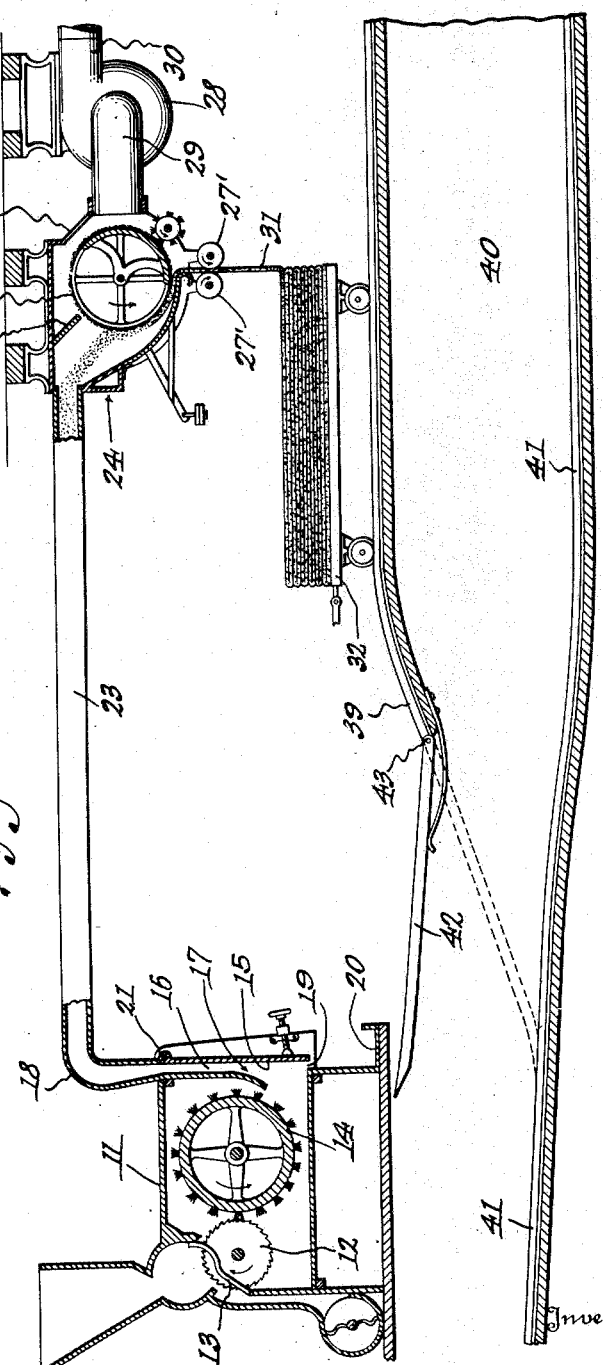

In the accompanying drawings forming a part of this specification, and in which like numerals are employed to designate like parts throughout the same, Figure 1 is a plan view of apparatus embodying my invention, Figure 2 is a side elevation, parts in central vertical longitudinal section, through the condenser and felt producing means, Figure 2$^a$ is a side elevation, parts in central vertical longitudinal section, through the mattress stuffing end of the apparatus, Figure 3 is a side elevation of the mattress press or stuffing apparatus, Figure 4 is a transverse section taken on line 4—4 of Figure 2$^a$, Figure 5 is a side elevation, parts in vertical section, through a modified form of linter gin showing a different form of separating means, Figure 6 is a side elevation of the condenser showing a modified means for arranging the felt in layers and feeding the same continuously, Figure 7 is a plan view of the feeding conveyor, Figure 8 is a plan view of a modified form of condenser screen and conveyor associated therewith, and Figure 9 is a plan view, upon an enlarged scale, of the condenser cylinder.

In the drawings, wherein for the purpose of illustration is shown a preferred embodiment of my invention, the numeral 10 designates a plurality of linter gins, preferably arranged in longitudinal rows, as shown. Each linter gin embodies a substantially closed casing 11, within which is arranged the usual rotating saws 12, passing through the ribs 13. Arranged at the rear of the saws 12 is a revoluble brush 14, which serves to remove the linters from the teeth of the saws 12, and throws the same toward or against the panel or plate 15. Means are provided to rotate the saw 12 in the direction of its arrow, and the brush 14 is rotated in an opposite direction to the saws, in the direction of its arrow. Arranged within the casing 11, in the upper portion thereof, is a partition or panel 16, spaced from the bottom of the casing, and forming with the adjustable panel 15 a flue or passage 17, leading at its upper end into a branch conduit 18. There is an air inlet opening 19 at the bottom of the panel 15, in communication with the passage 17, through which the air is freely drawn, by suction means to be described, in its upward travel through the passage 17. Particular attention is called to the fact that the rotating brush 14 throws the lint and heavy particles, such as cotton seed, in a downwardly direction toward the panel 15, and this is important, inasmuch as it naturally throws the lint in a position above the cotton seed, or heavy foreign matter, whereby the lint is not drawn through such heavy foreign matter, during the action of separation. In the lower end of the flue 17, the lint and foreign matter may be said to float in the ascending air current, and the separation of the heavy foreign matter is effected by gravity, the same dropping upon the bottom 20, where it may be removed by hand or any other suitable means. It is desirable that the cross sectional area of the flue 17 be varied, for regulating the separating action by gravity, of the heavy foreign matter, in the upwardly ascending air current, and for this purpose the panel 15 is laterally adjustable. The panel for this purpose may be hinged at its upper end, as indicated at 21, and the same may be swung outwardly or inwardly by hand or any suitable means, and locked in adjustment at a selected position. The adjustment of the passage 17 may be effected in a different manner, as indicated in Figure 5. In this figure, the vertical passage 17' is provided by means of a sliding casing section 21, fitting over the rear end of the casing 11, with a resilient panel 22, secured in the top of the casing section 21' and engaging the casing 11. The casing section 21 may be shifted toward or away from the casing 11 by hand or any other suitable means and may be locked in the adjusted position. The same pipe 18 leads into the vertical passage 17'.

While it is preferred to equip the linter gins with the means for separating out the foreign solid matter from the linters, yet some degree of success may be obtained by omitting the same, and I contemplate using the linter gins without this separating means.

As clearly shown in Figure 1, the several branch pipes 18 lead into a common suction pipe 23, which increases in diameter toward its oulet end, the increase in diameter preferably occurring at the connection of each pair of branch pipes 18. This common suction pipe leads into the intake end of a common condenser 24, embodying a casing 25. Rotatable within this casing is a rotatable condenser cylinder screen 26, operating beneath a partition 27. The opposite side of the casing 25 has connection with a rotary exhaust fan 28, by means of a pipe 29. The outlet pipe 30 of this rotary suction fan may lead to a cyclone separator, which may be employed to recover any of the fibre, which may have escaped through the screen drum.

In accordance with my improved method, I take the linters 31, as it passes from the screen drum 26, and preserve it in the layer form and directly work it into felt. This may be accomplished in various ways. As illustrated in Figure 2, I may discharge these linters 31 in its layer form upon a reciprocating carriage 32, which may be caused to travel back and forth at a uniform speed throughout its travel, so that the linters in the layer form is arranged in any suitable number of layers to produce felt. I contemplate producing the linter felt any selected width and length, as for instance to correspond to the size of the mattress to be made, and the desired height or thickness of the pile may be obtained by regulating the number of layers of the lint in the felt form. It is thus seen that I produce direct from the condenser screen a felt in layer form, without the necessity of passing the linters through the garnetting machine. In the ordinary practice in the trade, the linters removed from the condenser screen is fed into a hopper, without regard to preserving the different characteristics, and subsequently compressed in the press, which destroys its felt characteristics. The pile of linters thus produced is subsequently worked through a garnetting machine, which reworks the linters and produces the felt. I have found that by arranging the linters obtained directly from the condenser screen, in the form of felt in layers, that a superior product is obtainable. The felt produced by my method has its fibres extending in all directions, in its plane, and hence its tensile strength is uniform in all directions in the plane thereof.

In Figures 6 and 7, I have shown the linters 31 discharging from the condenser screen, passing upon a slowly traveling endless belt 33, which moves at a right angle to the direction of discharge of the linters. This endless belt is moved upon a carriage 34, which travels at a right angle to the direction of travel of the belt 33. The endless belt is inclined downwardly towards its discharge end, and as a result of the feeding of the linters, in the layer form, the felt is produced upon the same, which gradually increases toward the discharge end of the endless conveyor, at which point the maximum thickness of the felt is produced. This felt may be wound in a roll when passing from the discharge end of the endless belt, or cut or folded into desired lengths or shapes. In any event, the linters, in the felt form, is ready for use while preserving the felt form, when collected from the condenser screen, without being passed through the garnetting machine.

I also contemplate rolling the linters, in the felt form, direct from the condenser screen, in a continuous spiral form, which may be accomplished by any suitable means.

In Figures 8 and 9 of the drawings, I have shown a modified form of condenser screen for use in the condenser 24. This condenser screen is designated by the reference character 35, and has the screen surface 36, upon which are arranged imperforate annular strips 37, which causes the screen to produce separate longitudinal strips of linters. These strips of linters are fed upon an endless carrier 38, supported therebeneath. The lint in the layer form is continuously fed upon this endless carrier which travels back and forth in a longitudinal direction beneath the condenser. The length of the forward travel of the endless carrier 38 is greater than the length of the rearward travel, and as a result of this, the strips of linter layers are arranged in superposed relation and obtain the maximum thickness, at the discharge end of the endless carrier. These strips of linter felt may be folded or wound into rolls or fed into the mattress or the like. Attention is called to the fact that the width of these strips of linter felt may be regulated by varying the width between the imperforate strips 37. By omitting the imperforate ribs 37, and discharging the linters in the layer form, upon the endless carrier 38, moving in the opposite directions as described, a continuous strip of felt may be produced, in the layer form, having a suitable width for filling the mattress or the like.

Attention is called to Figures 2–2ª, where it will be seen that the carriage 32 travels upon a track 39, arranged above a subway 40, having a track 41 therein. A spring-pressed track extension 42 is pivoted to the track 39, at 43, and when depressed, is adapted to lead to the track 41. When the movement of the carriage 32 is completed, it is pushed forwardly, and depresses the track extension 42 whereby the carriage is transferred to the lower track 41. This carriage may be drawn longitudinally to the right along the track 41 within the subway until the right end of the track is reached, where the mattress stuffing machine is located. I contemplate employing at least two carriages 32, so that one may be filled while the other is being used at the mattress stuffing machine. The carriage 32 which has been arranged at the mattress stuffing machine, after it has been emptied, is first returned upon the pivoted track extensions 42', and passed to the upper track 39, prior to the movement of the filled carriage to this point, the track extensions 41 moving upwardly to permit of the discharge of the carriage upon the track 41.

The numeral 44 designates a table at the mattress stuffing machine, which is adapted to support the mattress as it is being stuffed, and thereafter. The mattress stuffing machine embodies a frame 45, carrying the spout 46, upon which the tick is crimped or skinned. The frame holds therein a weight or plunger 47, preferably in the form of a flat board, which is adapted to rest upon the top of the linter felt, arranged upon the carriage 32. This plunger 47 is hinged at its lower end to swing vertically between the sides 45' of the frame. This plunger also carries a plunger 48, slidable upon its lower face, and serving to force the linter felt out through the spout 46. The plunger may be moved to the right by any suitable means, and I contemplate using flexible elements or cables 49, attached thereto, and adapted to be wound upon the drums 50, and mounted upon a shaft 51, which may be turned by a crank 52.

In the practice of my method, in connection with the apparatus, the cotton seed with the lint thereon is fed into the hopper of the linter gins and the linters removed from the cotton seed. These linters are removed from the saws 12 by the brushes 14, which throw the same downwardly and to the right, into the presence of the upwardly ascending current of air, traveling through the passage 17. The heavy foreign matter, such as cotton seed or the like, separates out by gravity from the linters while the same is suspended in the air, and the cleaned linters are drawn into the suction pipe 23 and hence conveyed to the forward side of the condenser screen 26 of the condenser. These linters are moved from the screen by means of the revolving rollers 27', and in Figure 2 are fed upon the table 32, which is caused to reciprocate back and forth whereby the linters, in the layer form, are arranged in a suitable number of layers to produce the felt. The carriage 32 with the linter felt thereon, is now brought to the mattress making machine, as described, and the plunger 47 is lowered thereon, which serves to compress the linter felt to the approximate thickness of the mattress. The ejector plunger 48 is now moved to the right and the felt is forced through the spout 46 into the mattress ticking. The mattress is finally sewed at its open end, as is well known.

While I have found that my apparatus and method is particularly well adapted for producing felt from linters, I also contemplate using the same for producing felt from cotton, when it is desirable to do so.

I also contemplate forming a slit in the wall 15 of the separator of the linter gin, and introducing a piece of gauze in this slit, or covering the same with the gauze, so that some of the linters will accumulate thereon, whereby the character of the linters may be tested.

I also contemplate making a felt by treating cotton waste. I first run this cotton waste through a willowing machine, for separating out the very large solid foreign matter, and some of the dirt, and causing it to be rendered somewhat fluffy. This cleaned cotton waste is then run through a gin, such as the linter gin shown in Figure 2 of the drawings, then through the air separator of the gin, then through the condenser and finally through the lapping means to be arranged in layers for producing felt.

I wish it understood that when the term "linters type cotton fiber" is employed in the claims that the same is used to designate cotton linters as produced from a linters gin, or reginned linters, or cotton waste, a large portion of which cotton linters and cotton waste has its fibers so short that when the same is condensed upon a screen and removed therefrom and rolled into layers that it will be impractical, if not impossible, to unroll the rolled layers, due to the fact that the layers adhere to each other.

It is to be understood that the form of my invention herewith shown and described is to be taken as a preferred example of the same, and that various changes in the shape, size, and arrangement of parts, may be resorted to, without departing from the spirit of my invention, or the scope of the subjoined claims.

Having thus described my invention, I claim:

1. The method of producing a mattress felt, which comprises a condensing aerated linters type cotton fiber upon a revolving screen to produce a continuous fluffy layer having its fibers extending substantially uniformly in all directions in the same general plane, removing the layer from the screen without substantially disturbing its fiber arrangement and lapping the same to produce superposed layers whereby a felt is obtained, and preserving the felt for use in such form.

2. The method of producing a mattress felt, which comprises condensing aerated linters type cotton fiber upon a revolving screen to produce a continuous substantially fluffy layer having its fibers extending substantially uniformly in all directions in the same general plane, removing the layer from the screen without substantially disturbing its fiber arrangement and lapping the same into generally flat superposed layers for producing a generally flat mattress felt, and immediately introducing the felt thus produced into a mattress casing or the like.

3. The method of producing a mattress felt, which comprises condensing aerated linters type cotton fiber upon a revolving screen to produce a continuous substantially fluffy layer of a selected width and having its fibers extending substantially uniformly in all directions in the same general plane, removing the layer from the screen without substantially disturbing its fiber arrangement and lapping the same into flat superposed layers for producing a generally flat mattress felt, and preserving the felt thus produced as such whereby it may be introduced into a mattress casing or the like without having its felt condition substantially destroyed.

4. The method of producing a mattress felt, which comprises condensing aerated linters type cotton fiber upon a revolving screen to produce a continuous substantially fluffy layer of a selected width and having its fibers extending substantially uniformly in all directions in the same general plane, removing the layer from the screen without substantially disturbing its fiber arrangement and lapping the same into generally flat superposed layers of substantially the same selected length for producing a generally flat mattress felt of a width and length to substantially completely fill the mattress casing or the like, and preserving the felt thus produced as such whereby it may be introduced into the mattress casing or the like without having its felt condition substantially destroyed.

5. The method of producing a mattress felt, which comprises condensing aerated linters type cotton fiber upon a revolving screen to produce a continuous substantially fluffy layer of a selected width and having its fibers extending substantially uniformly in all directions in the same general plane, removing the layer from the screen without substantially disturbing its fiber arrangement and lapping the same into a number of generally flat superposed layers of substantially the same selected length for producing a generally flat mattress felt of a width, length, and thickness to substantially completely fill the mattress casing or the like, and preserving the felt thus produced as such whereby it may be introduced into the mattress casing or the like without having its felt condition substantially destroyed.

6. A mattress felt of the shape and size to substantially completely fill a mattress casing or the like, comprising a plurality of superposed layers of substantially fluffy condensed linters type cotton fiber, the fibers in each layer extending substantially uniformly in all directions in the same general plane, said layers being obtained from a condenser screen and preserved in a substantially flat condition without substantially disturbing the fiber arrangement, said layers being in the form of one continuous layer.

7. A mattress felt of the shape and size to substantially fill a mattress casing or the like, comprising a plurality of superposed layers of substantially fluffy condensed linters type cotton fiber, the major portion of the fibers in each layer extending substantially uniformly in all directions in the same general plane, said layers being obtained from a condenser screen and preserved in a substantially flat condition without substantially disturbing the fiber arrangement.

8. The method of producing a mattress felt, which comprises condensing aerated linters type cotton fiber upon an elevated revolving screen to produce a continuous substantially fluffy layer, removing the layer from the screen without substantially disturbing its fiber and discharging the same downwardly upon a reciprocating support whereby a plurality of superposed layers are accumulated upon the support in a generally flat relation to produce the mattress felt, and preserving the felt as such for use in filling a mattress casing or the like.

9. In apparatus of the character described, an elevated condenser embodying a rotatable screen drum, means for supplying aerated cotton fiber to the drum to produce a continuous layer thereon, a reciprocating support arranged near and beneath the drum, and means for removing the continuous layer from the drum and feeding the same directly to the reciprocating support.

10. In apparatus of the character described, a condenser having its discharge elevated, and employing a rotatable screen, means for supplying aerated cotton fiber to the screen for producing a continuous layer thereon, a reciprocating support arranged near and beneath the discharge of the condenser for receiving the layer therefrom without substantially disrupting the same, and means to reciprocate the support.

11. A mattress felt of the shape and size to substantially completely fill a mattress casing or the like, comprising a plurality of superposed layers of condensed aerated linters type cotton fiber, the major portion of said layers being preserved in an unfolded condition and without a substantial disturbing of the original fiber arrangement.

12. The method of producing a mattress felt, which comprises condensing aerated linters type cotton upon a revolving screen to produce a layer of the same, removing the layer from the screen without substantially disturbing its fiber arrangement and lapping the same without substantially disturbing its fiber arrangement to produce superposed layers whereby a felt is obtained, and preserving the felt for use in such form.

13. The method of producing a mattress felt, which comprises condensing aerated linters type cotton fiber upon revolving screen means to produce the same in layer formation, removing the material from the screen means without substantially disturbing its fiber arrangement, arranging the material thus obtained in superposed layers without substantially disturbing its fiber arrangement and preserving the superposed layers for use in this form.

14. In apparatus of the character described, a condenser embodying a rotatable screen, means for supplying aerated linters type cotton fiber to the drum for producing a layer thereon, a reciprocating support arranged near the discharge end of the condenser, and means for removing the layer from the screen and feeding the same to the reciprocating support without substantially disturbing the fiber arrangement of the same.

In testimony whereof I affix my signature.

HENRY M. HERBENER.